United States Patent
Hammond et al.

(10) Patent No.: US 6,865,685 B2
(45) Date of Patent: Mar. 8, 2005

(54) POWER SUPPLY EVENT NOTIFICATION SYSTEM FOR SENDING AN ELECTRONIC NOTIFICATION TO MULTIPLE DESTINATIONS

(75) Inventors: Brad T. Hammond, North Kingstown, RI (US); Daniel J. Redmond, Bradford, RI (US); Jeffrey B. Collemer, Cumberland, RI (US); Todd J. Giaquinto, Cranston, RI (US); Diane M. L'Heureux, Middletown, RI (US)

(73) Assignee: American Power Conversion, West Kingston, RI (US)

( * ) Notice: Subject to any disclaimer, the term of this patent is extended or adjusted under 35 U.S.C. 154(b) by 610 days.

(21) Appl. No.: 09/812,665

(22) Filed: Mar. 20, 2001

(65) Prior Publication Data

US 2002/0138775 A1 Sep. 26, 2002

(51) Int. Cl.[7] .............................. G06F 1/28; G05B 11/01
(52) U.S. Cl. .................... 713/340; 713/300; 700/22; 714/22
(58) Field of Search ............................... 713/340, 300, 713/310; 700/22; 714/14, 22

(56) References Cited

U.S. PATENT DOCUMENTS

| | | | | |
|---|---|---|---|---|
| 5,319,571 A | * | 6/1994 | Langer et al. | 713/300 |
| 5,381,554 A | * | 1/1995 | Langer et al. | 714/14 |
| 5,745,670 A | * | 4/1998 | Linde | 714/22 |
| 5,961,604 A | * | 10/1999 | Anderson et al. | 709/229 |
| 6,344,730 B1 | * | 2/2002 | Rohrbock et al. | 320/132 |
| 6,396,391 B1 | * | 5/2002 | Binder | 340/310.01 |
| 6,629,247 B1 | * | 9/2003 | Hall et al. | 713/300 |
| 6,691,248 B1 | * | 2/2004 | Nishijima et al. | 714/14 |

FOREIGN PATENT DOCUMENTS

| | | | |
|---|---|---|---|
| JP | 11-259185 | * | 9/1999 |
| JP | 2000-078224 | * | 3/2000 |

OTHER PUBLICATIONS

John B. Hoover, "The Changing World of Power Monitoring", IEEE 2000, pp 103–108.*

* cited by examiner

Primary Examiner—Chun Cao
(74) Attorney, Agent, or Firm—Mintz, Levin, Cohn, Ferris, Glovsky and Popeo, P.C.

(57) ABSTRACT

An event notification system for a plurality of power supplies coupled to a computer network is provided. In one embodiment of the invention, the notification system includes a computer system connected to the computer network, wherein the computer system includes a database, a data retrieval program, a comparison program and an electronic notification program. The data retrieval program obtains data from the plurality of power supplies. The comparison program compares the data from the plurality of power supplies with data of at least one predetermined event to determine if a predetermined event has occurred. The database stores information relating to an occurrence of the predetermined event and the number of the power supplies associated with the occurrence of the predetermined event. The electronic notification program sends an electronic notification, which includes information about the occurrence of the predetermined event and the number of the power supplies to which the event occurred, to one or more predetermined destinations. In another embodiment of the invention, a method of providing notification of a predetermined event of a power supply is provided.

44 Claims, 2 Drawing Sheets

POWER SUPPLY EVENT NOTIFICATION SYSTEM FOR SENDING AN ELECTRONIC NOTIFICATION TO MULTIPLE DESTINATIONS

FIELD OF THE INVENTION

The present application relates generally to an event notification system for a power supply. More specifically, it relates to event monitoring and notification for an uninterruptible power supply (UPS).

BACKGROUND OF THE INVENTION

The use of UPS's having battery back-up systems to provide regulated, uninterrupted power for critical and/or sensitive loads, such as computer systems and other data processing systems is well known. In one application, one to several UPS's can be connected to a computer network so that the network can communicate with each UPS.

In some instances, it may be necessary to know if a certain event, such as a battery failure, has happened to a UPS. A prior method of detecting an event in a UPS included manually searching through trap logs to look for an indication that a certain event happened to a UPS. However, this method can be ineffective and time consuming if hundreds or thousands of UPS's are connected to a computer network.

One prior art software package, Powerchute Plus, manufactured by the American Power Conversion Corp. of W. Kingston, R.I., is installed on a single computer or server and monitors the UPS connected to that computer for certain types of data. However, when Powerchute Plus is installed on a computer, it only monitors the UPS that is connected to that computer. Thus, under normal operating conditions, a single copy of the Powerchute Plus software will not monitor a plurality of UPS's connected to a network.

SUMMARY OF THE INVENTION

In one embodiment of the invention, the event notification system for a plurality of power supplies coupled to a computer network includes a computer system connected to the computer network, wherein the computer system includes a database, a data retrieval program, a comparison program and an electronic notification program. The data retrieval program obtains data from the plurality of power supplies. The comparison program compares the data from the plurality of power supplies with data of at least one predetermined event to determine if a predetermined event has occurred. The database stores information relating to an occurrence of the predetermined event and the number of the power supplies associated with the occurrence of the predetermined event. The electronic notification program sends an electronic notification, which includes information about the occurrence of the predetermined event and the number of the power supplies to which the event occurred, to one or more predetermined destinations.

In another embodiment of the invention, a method of providing notification of a predetermined event of a power supply includes obtaining data from the power supply, comparing the obtained data from the power supply with at least one predetermined event to determine if a predetermined event has occurred, storing information relating to the occurrence of the predetermined event and the number of the power supplies associated with the occurrence of the predetermined event, and sending over the computer network an electronic mail including information relating to the occurrence of the predetermined event and the number of the power supplies associated with the occurrence of the predetermined event.

An advantage of embodiments of the invention include automatically determining if one or more specified events occurred to one or more of the plurality power supplies rather than completing the task manually. Additionally, in embodiments of the invention, one or more users can automatically be provided an electronic notification, such as an e-mail, of the occurrence of the one or more specified events.

DETAILED DESCRIPTION OF THE INVENTION

Figure 1:
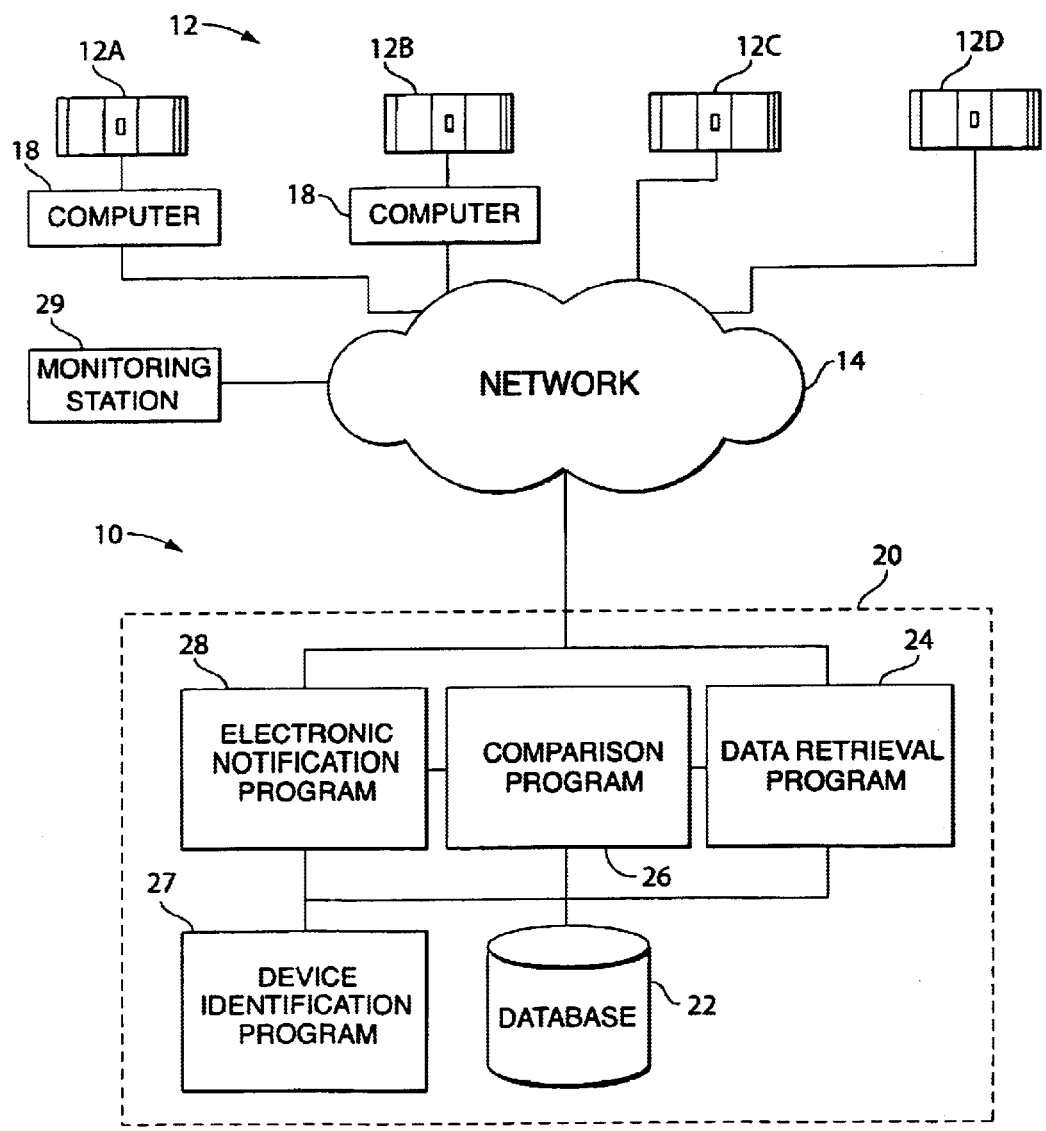
FIG. 1 is an exemplary block diagram of the power supply event notification system according to the present invention.

Referring to FIG. 1, the power supply event notification system 10 can include a plurality of uninterruptible power supplies (UPS) 12a–12d that are each connected to a computer network 14. Each UPS 12 can be connected to the network through the use of a network card 16 in the UPS or the UPS can be serially connected to a computer 18 that has a network card. The network can be a local area network (LAN), a wide area network (WAN) or the Internet. Also connected to the network is a server computer 20. Server computer 20 has a database 22 and one or more software programs running thereon. For example, the server can have a data retrieval program 24, a comparison program 26, an electronic notification program 28 and a device identification program 27 as described below. The electronic notification program 28 can send an electronic notification, such as an e-mail, if a predetermined event should occur to a UPS. The server can use the simple network management protocol (SNMP) to communicate with the one or more UPS's.

The network 14 can also be connected to a monitoring station 29, which can be located at a vendor's facility. One example of a monitoring station is American Power Conversion's Network Operations Center. An electronic notification, such as an e-mail, can be sent to the monitoring station if a predetermined event should occur to one or more of the UPS's. The benefit of having a monitoring station connected to the network is that it allows the station not only to keep up-to-date information about the UPS's, but to offer timely maintenance or replacements for them as necessary.

Figure 2:
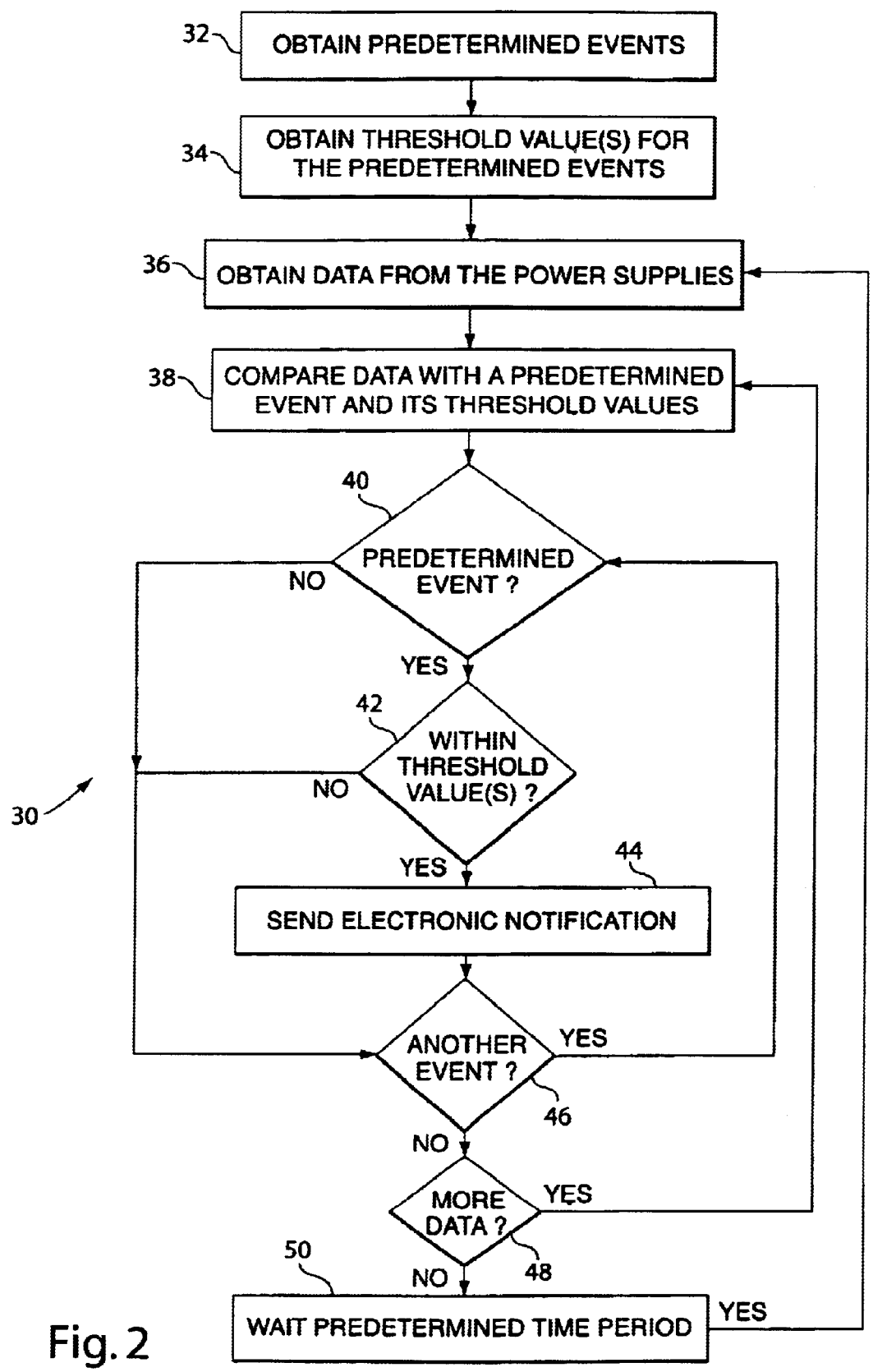
FIG. 2 is a flowchart of an exemplary method of monitoring a power supply according to the present invention.

Referring to FIG. 2, an exemplary method 30 for providing notification of a predetermined event to a power supply begins at 32 with obtaining information of one or more predetermined events. The predetermined events can include, for example, a specified age of a UPS, a power supply or a battery, a predetermined remaining runtime of a battery, a failure of a UPS, a power supply or a battery to pass a self diagnostic test, a UPS or power supply being unavailable or a change of the power load of the power supply system being greater than a predetermined limit. At 34, the server 20 obtains one or more threshold values if necessary, such as the age or the remaining runtime of a battery. The obtained threshold values are preferably set as default values in the server software and are changeable such that the default threshold values are user definable. A threshold level may not be necessary for some events, such as for the failure of a battery.

At 36, a data retrieval program obtains data over the network from the UPS's. At 38, a comparison program compares UPS data with a predetermined event to determine if one of the conditions has occurred. If no predetermined condition has occurred, the comparison program goes to step 46. If a predetermined condition has occurred at 40, then the comparison program determines at 42 whether the condition was within the one or more predetermined threshold values if any were specified. If the condition wasn't within the predetermined threshold values, the comparison program goes to 46. If the condition was within the predetermined threshold values, then at 44 the electronic notification system will send an electronic notification such as an e-mail or an instant messaging notification to one or more predetermined destinations. The comparison program can execute a loop in its program to ensure that it has compared all specified events at 46 and all data at 48 and if it has not done so then go back to 40 or 38, respectively. Once all the data has been compared to all the events, the system can wait a predetermined time period before obtaining data from the UPS's again and at 36 repeating the method described herein. Alternatively, the method described herein may only be used when a fault or event is suspected and thus, it may not be necessary that the program repeat itself at 50.

Preferably, the electronic notification program reports all data that it has gathered such that a user can make the most informed decisions based on the reported data. Alternatively, the electronic notification program can be selective in the reported data. For example, the specified events can have a hierarchy in which once a highest event has been found to occur, it will not be necessary to check and report the occurrence of the other events for that power supply or even the whole network if desired. This may be preferable to prevent the sending of two messages for the same event, such as "a UPS battery has expired" and "a UPS does not have backup power," when the reason that the UPS does not have backup power is that its battery has expired.

Preferably, the electronic notification program doesn't send out a notification until all data has been compared with all the events. For example, the electronic notification can report the data as "17 UPS's are too old" and/or "5 UPS's have a remaining runtime less that 30 minutes." After the notification program 28 has provided data about the number of devices to which one or more predetermined events has occurred, a device identification program 27 can be run to specify exactly the devices to which the reported predetermined event has occurred. It should be noted that the information about the number of devices provided by the notification program 28 can include the exact number of devices or merely be a list of the devices to which the event occurred that can be added to provide the number of devices.

It should be understood that although the description above has described embodiments of the invention as having a separate data retrieval program, a comparison program and an electronic notification program, the three programs can easily be combined within one or two programs or could be separated into more than three programs and still be within the scope of the invention. Also, the methods of the programs can be completed either through software or hardware. Any software used with the present invention can be stored on any type of a computer usable medium for storing data, such as, for example, but not limited to, floppy disks, magnetic tape, zip disks, hard drives, CD-ROM, optical disks, or a combination of these.

It should be also understood that although the description above has described embodiments of the invention as used with a UPS, the invention is also applicable to systems using one or more power supplies connected to a computer network.

The present invention allows users to provide better reliability for UPS's and/or power supplies because the users can obtain various types of information about the UPS's and/or power supplies and maintain or replace them as required. Additionally, if the obtained data is sent to a vendor, such as through an e-mail, the vendor can use the information to improve or upgrade a product if data indicates that the product has deficiencies.

Having thus described at least one illustrative embodiment of the invention, various alterations, modifications and improvements will readily occur to those skilled in the art. Such alterations, modifications and improvements are intended to be within the scope and spirit of the invention. Accordingly, the foregoing description is by way of example only and is not intended as limiting. The invention's limit is defined only in the following claims and the equivalents thereto.

What is claimed is:

1. An event notification system for a plurality of power supplies coupled to a computer network, the notification system comprising:
   a computer system connected to the computer network, the computer system being adapted to:
      obtain data over the network from the plurality of power supplies;
      compare the data obtained from the plurality of power supplies with data of at least one predetermined event to determine if a predetermined event has occurred;
      store information relating to an occurrence of the predetermined event and a number of power supplies associated with the occurrence of the predetermined event; and
      send an electronic notification to one or more predetermined destinations, the electronic notification including information about the occurrence of the predetermined event and the number of the power supplies to which the event occurred.

2. The notification system of claim 1, wherein the electronic notification is an e-mail.

3. The notification system of claim 2, wherein one of the destinations of the e-mail is a monitoring station.

4. The notification system of claim 2, wherein an SMTP server of the electronic mail notification can be designated.

5. The notification system of claim 1, wherein the predetermined event is a predetermined age of at least one battery.

6. The notification system of claim 1, wherein the predetermined event is a predetermined age of the power supply system.

7. The notification system of claim 1, wherein the predetermined event is a predetermined remaining runtime of at least one battery.

8. The notification system of claim 1, wherein the predetermined event is a failure of the power supply system to pass a self diagnostic test.

9. The notification system of claim 1, wherein the predetermined event is a battery of one of the at least one power supplies needing to be replaced.

10. The notification system of claim 1, wherein the predetermined event is a power load of the power supply system being greater than a predetermined limit.

11. The notification system of claim 1, wherein the predetermined event is a difference of a power load of the power supply system measured at a first time and a second time being greater than a predetermined limit.

12. The notification system of claim 1, wherein the predetermined event is the power supply system being unavailable.

13. The notification system of claim 1, wherein the computer system is further adapted to identify the power supply to which the predetermined event occurred.

14. A notification system for a plurality of power supplies coupled to a computer network, the notification system comprising:
- a computer system connected to the computer network, the computer system including:
  - means for obtaining data from plurality of power supplies;
  - means for comparing the data from the plurality of power supplies with data of at least one predetermined event to determine if a predetermined event has occurred;
  - means for storing information relating to an occurrence of the predetermined event and a number of power supplies associated with the occurrence of the predetermined event; and
  - means for sending an e-mail to one or more predetermined destinations, the e-mail including information about the occurrence of the predetermined event and the number of the power supplies to which the event occurred.

15. The notification system of claim 14, wherein the electronic notification is an e-mail.

16. The notification system of claim 15, wherein one of the destinations of the e-mail is a monitoring station.

17. The notification system of claim 15, wherein an SMTP server for the e-mail can be designated.

18. The notification system of claim 14, wherein the predetermined event is a predetermined age of at least one battery.

19. The notification system of claim 14, wherein the predetermined event is a predetermined age of the power supply system.

20. The notification system of claim 14, wherein the predetermined event is a predetermined remaining runtime of at least one battery.

21. The notification system of claim 14, wherein the predetermined event is a failure of the power supply system to pass a self diagnostic test.

22. The notification system of claim 14, wherein the predetermined event is a battery of one of the at least one power supplies needing to be replaced.

23. The notification system of claim 14, wherein the predetermined event is a power load of the power supply system being greater than a predetermined limit.

24. The notification system of claim 14, wherein the predetermined event is a difference of a power load of the power supply system measured at a first time and a second time being greater than a predetermined limit.

25. The notification system of claim 14, wherein the predetermined event is the power supply system being unavailable.

26. The notification system of claim 14, wherein the computer system further includes means for identifying the power supply to which the predetermined event occurred.

27. A method of providing over a computer network connected to a plurality of power supplies a notification of a predetermined event one of the plurality of power supplies, the method comprising:
- obtaining data over the computer network from the plurality of power supplies;
- comparing the data obtained from at least one of the power supplies with data of at least one predetermined event to determine if the predetermined event has occurred;
- storing information relating to an occurrence of the predetermined event and the number of the power supplies to which the event occurred; and
- sending over the computer network an electronic notification including information relating to the occurrence of the predetermined event arid the number of the power supplies to which the event occurred.

28. The method of claim 27, further comprising comparing the data obtained from the at least one power supply with at least one threshold value to determine if a predetermined event has occurred.

29. The method of claim 28, wherein comparing the data obtained from the at least one power supply with at least one threshold value comprises comparing the data obtained from the power supply with a predetermined age of the at least one battery to determine if the at least one battery is too old.

30. The method of claim 28, wherein comparing the data obtained from the power supply with at least one threshold value comprises comparing the data obtained from the power supply with a predetermined age of the power supply to determine if the power supply is too old.

31. The method of claim 27, wherein comparing the data obtained from the power supply with at least one predetermined event comprises using data from the power supply to determine if the power supply system is unavailable.

32. The method of claim 27, wherein comparing the data obtained from the power supply with at least one predetermined event comprises using the data obtained from the power supply to determine if the power supply system failed to pass a self diagnostic test.

33. The method of claim 27, wherein comparing the data obtained from the power supply with at least one predetermined event comprises comparing an age of a battery with a predetermined age to determine if the battery is too old.

34. The method of claim 27, wherein comparing the data obtained from the power supply with at least one predetermined event comprises comparing an age of a power supply system with a predetermined age to determine if the power supply system is too old.

35. The method of claim 27, wherein comparing the data obtained from the power supply with at least one predetermined event comprises comparing a remaining runtime of a battery with a predetermined time period to determine if the remaining runtime of the battery is too short.

36. The method of claim 27, wherein comparing the data obtained from the power supply with at least one predetermined event comprises comparing data from the power supply to determine if the power supply system has failed to pass a self diagnostic test.

37. The method of claim 27, wherein comparing the data obtained from the power supply with at least one predetermined event comprises using data from the power supply to determine if a battery of one of the plurality of power supplies needs to be replaced.

38. The method of claim 27, wherein comparing the data obtained from the power supply with at least one predetermined event comprises comparing a difference of a power load of a power supply measured at a first time and a second time with a predetermined limit to determine if the difference is too large.

39. The method of claim 27, further comprising waiting a predetermined time period before obtaining data from the power supply again.

40. The method of claim 27, wherein sending over the computer network an electronic notification comprises sending over the computer network an e-mail.

41. The method of claim 27, wherein the electronic notification is an e-mail, further comprising sending to a monitoring station an e-mail including information relating to the occurrence of the predetermined event and a number of the power supplies associated with the occurrence of the predetermined event.

42. The method of claim 27, further comprising identifying the power supply to which the predetermined event occurred.

43. An article of manufacture, comprising:
a computer usable medium having computer readable program code means embodied therein for providing over a computer network connected to a plurality of power supplies a notification of a predetermined event one of the plurality of power supplies, the computer readable program code means in said article of manufacture comprising:

computer readable program code means for causing the computer system to obtain data over the computer network from the plurality of power supplies;

computer readable program code means for causing the computer system to compare the data obtained from at least one of the power supplies with at least one predetermined event to determine if the predetermined event has occurred;

computer readable program code means for causing the computer system to store information relating to an occurrence of the predetermined event and the number of the power supplies to which the event occurred; and computer readable program code means for causing the computer system to send over the computer network an electronic notification including information relating to the occurrence of the predetermined event and the number of the power supplies to which the event occurred.

44. The article of manufacture of claim 43, wherein the computer readable program code means in said article of manufacture further comprises:

computer readable program code means for causing the computer system to compare the data obtained from the at least one power supply with at least one threshold value to determine if a predetermined event has occurred.

* * * * *

UNITED STATES PATENT AND TRADEMARK OFFICE
CERTIFICATE OF CORRECTION

PATENT NO. : 6,865,685 B1  Page 1 of 1
APPLICATION NO. : 09/812665
DATED : March 8, 2005
INVENTOR(S) : Hammond et al.

It is certified that error appears in the above-identified patent and that said Letters Patent is hereby corrected as shown below:

Column 6, line 6, delete "arid" and insert --and--.

Signed and Sealed this

Twelfth Day of February, 2008

JON W. DUDAS
*Director of the United States Patent and Trademark Office*